(12) United States Patent
Rodniansky

(10) Patent No.: US 11,936,668 B2
(45) Date of Patent: Mar. 19, 2024

(54) IDENTIFYING CREDENTIAL ATTACKS ON ENCRYPTED NETWORK TRAFFIC

(71) Applicant: International Business Machines Corporation, Armonk, NY (US)

(72) Inventor: Leonid Rodniansky, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 17/403,995

(22) Filed: Aug. 17, 2021

(65) Prior Publication Data

US 2023/0057866 A1 Feb. 23, 2023

(51) Int. Cl.
*H04L 9/40* (2022.01)
(52) U.S. Cl.
CPC ...... *H04L 63/1416* (2013.01); *H04L 63/0435* (2013.01); *H04L 63/102* (2013.01); *H04L 63/1425* (2013.01); *H04L 63/20* (2013.01)
(58) Field of Classification Search
CPC .......................... H04L 63/1416; H04L 63/1425
See application file for complete search history.

(56) References Cited

U.S. PATENT DOCUMENTS

| | | | |
|---|---|---|---|
| 6,715,083 B1 * | 3/2004 | Tovander | ............ H04L 63/1416 726/23 |
| 9,699,203 B1 | 7/2017 | Yang | |
| 9,754,109 B1 | 9/2017 | Parker-Wood | |
| 10,148,683 B1 | 12/2018 | Lin et al. | |
| 10,567,412 B2 | 2/2020 | Merza et al. | |

(Continued)

FOREIGN PATENT DOCUMENTS

| | | |
|---|---|---|
| CN | 110417717 A | 11/2019 |
| JP | 2009187516 A | 8/2009 |

(Continued)

OTHER PUBLICATIONS

Jian et al., "Calculation of Tail Probability Based on Central Limit Theorem and Chernoff Bound", Telecommuincation Engineering, College of Information Science and Technology, Nanjing University of Aeronautics and Astronautics Nan Jing 210016, China, vol. 49, No. 5, May 2009, 4 Pgs.

(Continued)

*Primary Examiner* — William S Powers
(74) *Attorney, Agent, or Firm* — Stosch Sabo

(57) ABSTRACT

Described are techniques including a computer-implemented method of aggregating a number of authentication failures from a plurality of connection attempts for an application or a service that services a plurality of clients, where respective authentication failures are detected by evaluating encrypted packets of the plurality of connection attempts. The method further comprises determining that the number of authentication failures is greater than a upper bound number of authentication failures, where the upper bound number of authentication failures is determined by an anomalous function using the plurality of connection attempts as input, where the anomalous function is defined, at least in part, by a Chebyshev's bound and a Chernoff bound. The method further comprises generating an alert indicating a potential credential attack against the application or the service.

20 Claims, 8 Drawing Sheets

(56) References Cited

U.S. PATENT DOCUMENTS

| | | | |
|---|---|---|---|
| 10,708,288 B2 | 7/2020 | Coskun | |
| 2006/0029054 A1* | 2/2006 | Breh | G06F 8/61 |
| | | | 370/385 |
| 2006/0067240 A1 | 3/2006 | Kim et al. | |
| 2006/0242706 A1* | 10/2006 | Ross | G06F 21/55 |
| | | | 726/23 |
| 2007/0127438 A1* | 6/2007 | Newman | H04M 3/487 |
| | | | 370/352 |
| 2007/0240061 A1 | 10/2007 | Cormode | |
| 2008/0214298 A1* | 9/2008 | Byng | G07F 17/3206 |
| | | | 463/29 |
| 2012/0137367 A1 | 5/2012 | Dupont et al. | |
| 2017/0134362 A1 | 5/2017 | Randall | |
| 2017/0300453 A1 | 10/2017 | Shen et al. | |
| 2018/0248909 A1* | 8/2018 | Bharrat | H04L 63/1458 |
| 2019/0068564 A1* | 2/2019 | Putatunda | H04L 63/08 |
| 2020/0213334 A1* | 7/2020 | Kutner | H04L 63/101 |
| 2020/0287924 A1* | 9/2020 | Zhang | G06F 16/288 |

FOREIGN PATENT DOCUMENTS

| | | |
|---|---|---|
| WO | 2013027970 A1 | 2/2013 |
| WO | 2019213086 W | 11/2019 |

OTHER PUBLICATIONS

Patent Cooperation Treaty PCT Notification of Transmittal of the International Search Report and the Written Opinion of the International Searching Authority or the Declaration, International Application No. PCT/CN2022/096134, International Filing Date May 31, 2022, dated Sep. 7, 2022, 9 Pgs.

Wikipedia, "Chernoff bound", From Wikipedia, the free encyclopedia, last edited on Jun. 17, 2021, 8 pages <https://en.wikipedia.org/wiki/Chernoff_bound>.

Wikipedia, "Chebyshev's inequality", From Wikipedia, the free encyclopedia, last edited on Jul. 12, 2021, 24 pages <https://en.wikipedia.org/wiki/Chebyshev%27s_inequality>.

Poston, H., "Network traffic analysis for IR: SSH protocol with Wireshark", Jan. 30, 2020, 16 pages <https://resources.infosecinstitute.com/topic/network-traffic-analysis-for-ir-ssh-protocol-with-wireshark/>.

Klingerman, S., "Oracle Database Network Encryption (Native vs. TLS/SSL)", Quest Oracle Community, Last updated Jul. 28, 2020, 8 pages <https://questoraclecommunity.org/learn/blogs/oracle-database-network-encryption-native-vs-tls-ssl/>.

Wikipedia, "Credential stuffing", From Wikipedia, the free encyclopedia, last edited on Apr. 12, 2021, 3 pages <https://en.wikipedia.org/wiki/Credential_stuffing>.

Zhao et al., "Botnet detection based on traffic behavior analysis and flow intervals", Computers & Security 39 (2013), 15 pages.

Al-Duwairi et al., "BotDigger: A fuzzy inference system for botnet detection", 2010 Fifth international conference on internet monitoring and protection, 2010, 6 pages.

Gu et al., "BotMiner: Clustering Analysis of Network Traffic for Protocol- and Structure-Independent Botnet Detection", Proceedings of the 17th USENIX security symposium, 2008, 16 pages.

Freeman et al., "Who Are You? A Statistical Approach to Measuring User Authenticity", NDSS. vol. 16., 2016, 15 pages.

Mell et al., "The NIST Definition of Cloud Computing", Recommendations of the National Institute of Standards and Technology, Sep. 2011, 7 pages.

\* cited by examiner

```
Packet 13 FROM 9.70.xxx.xxx 2638 TO 9.70.xxx.xxx 33023 Packet length: 118
00000000 : 04 01 00 76 00 00 00 00 16 06 05 00 00 00 00 00  ...v............
00000010 : 0c 53 51 4c 20 41 6e 79 77 68 65 72 65 0f 00 00  .SQL Anywhere...
00000020 : 00 e5 00 49 00 00 0f a2 00 0e 05 32 38 30 30 30  ...I.......28000
00000030 : 00 00 00 00 00 34 53 51 4c 20 41 6e 79 77 68 65  .....4SQL Anywhe
00000040 : 65 20 45 72 72 6f 72 20 2d 31 30 33 3a 20 49 6e  e Error -103: In
00000050 : 76 61 6c 69 64 20 75 73 65 72 20 49 44 20 6f 72  valid user ID or
00000060 : 20 70 61 73 73 77 6f 72 64 00 00 00 fd 00 02     password.......
00000070 : 00 00 00 00                                      ....
CLOSE SOCKET REQUEST
```

FIG. 2A

```
Packet 13 FROM 9.70.xxx.xxx 2638 TO 9.70.xxx.xxx 33023 Packet length: 128
00000000 : 17 03 01 00 7b 39 5a ba 5d 4e 8d cf b9 33 70 79  ....{9Z.]N...3py
00000010 : 9d 62 26 f8 6d f8 d4 4e d3 f0 5c 4e 06 e9 61 9b  .b&.m..N..\N..a.
00000020 : 0e dd ab 40 c1 06 49 8f 2b 75 0d 82 a9 08 0b bc  ...@..I.+u......
00000030 : 76 c7 12 5c 2b cd 52 3e 09 6e 0c 62 b7 ed ec ca  v..\+.R>.n.b....
00000040 : f5 7a ed 5a 11 e3 e4 6f e0 fc 66 29 ca f0 b0 bc  .z.Z...o..f)....
00000050 : 3d 46 18 2c d0 4d 8c c5 cd 57 1f 91 c6 a8 23 9f  =F.,.M...W....#.
00000060 : e6 48 ea a7 ad 84 0e c4 72 de 7b 27 ed ca c5 c3  .H......r.{'....
00000070 : fe eb 68 5c f8 2d 2d b4 ad a9 4c 5d 56 e0 a3 40  ..h\.--...L]V..@
CLOSE SOCKET REQUEST
```

IDENTIFYING CREDENTIAL ATTACKS ON ENCRYPTED NETWORK TRAFFIC

BACKGROUND

The present disclosure relates to security of computer networks, and, more specifically, to identifying credential attacks without decrypting network traffic.

Credential attacks are serious and growing security threats. One type of credential attack is credential stuffing where a malicious actor uses compromised usernames, email addresses, and/or passwords (e.g., from a data breach) to gain unauthorized access to user accounts through large-scale, automated login requests. Another type of credential attack is a brute force credential attack (e.g., credential cracking), where a malicious actor submits many combinations of guessed usernames, email addresses, and/or passwords with the hope of eventually guessing correctly.

SUMMARY

Aspects of the present disclosure are directed toward a computer-implemented method of aggregating a number of authentication failures from a plurality of connection attempts for an application or a service that services a plurality of clients, where respective authentication failures are detected by evaluating encrypted packets of the plurality of connection attempts. The method further comprises determining that the number of authentication failures is greater than an upper bound number of authentication failures, where the upper bound number of authentication failures is determined by an anomalous function using the plurality of connection attempts as input, where the anomalous function is defined, at least in part, by a Chebyshev's bound and a Chernoff bound. The method further comprises generating an alert indicating a potential credential attack against the application or the service.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 2A illustrates an example unencrypted standard server response, in accordance with some embodiments of the present disclosure.

FIG. 2B illustrates an example encrypted standard server response, in accordance with some embodiments of the present disclosure.

Figure 1:
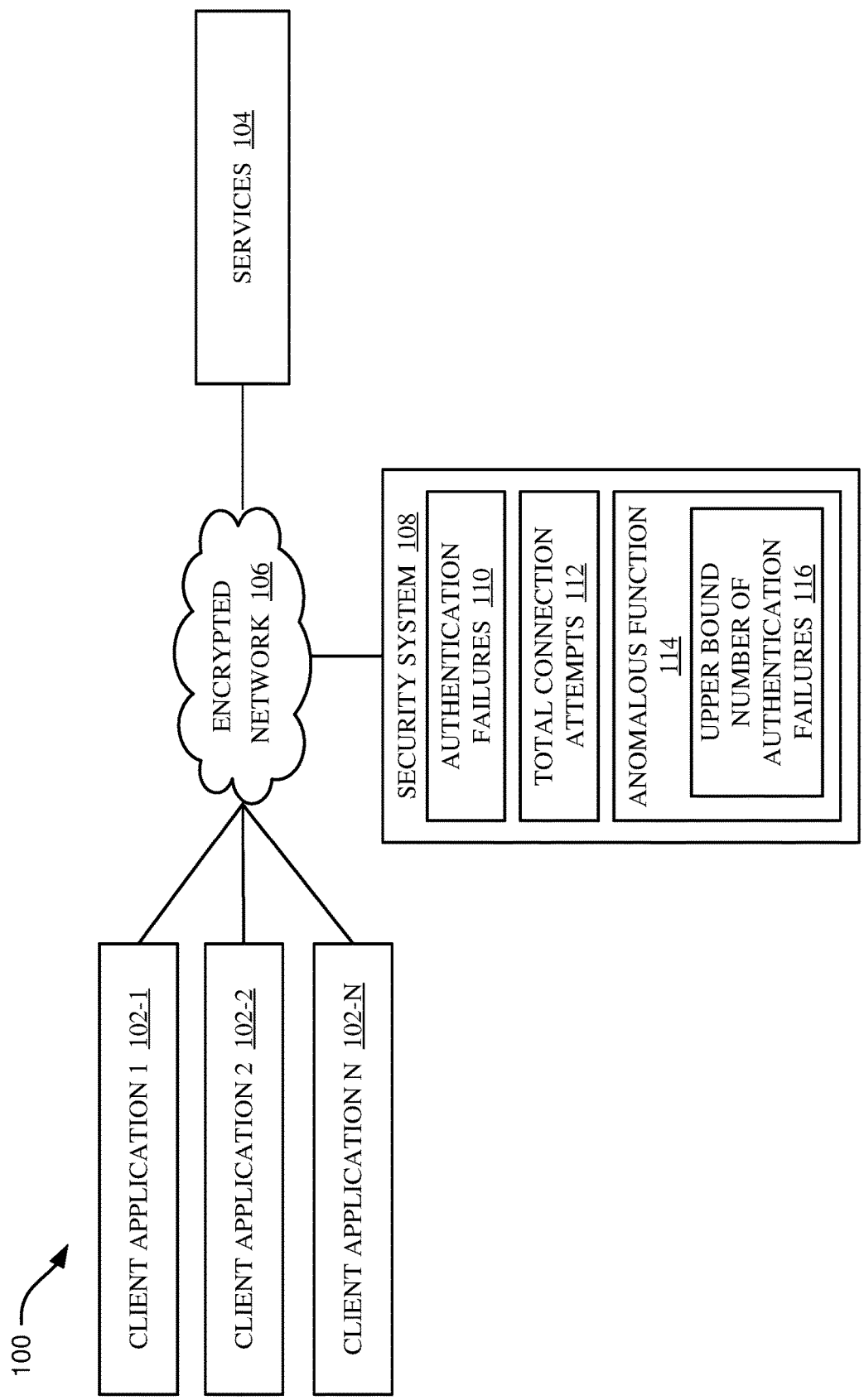
FIG. 1 illustrates a block diagram of an example computational environment with a security system for detecting credential attacks on encrypted network traffic, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward security of computer networks, and, more specifically, to identifying credential attacks without decrypting network traffic. While not limited to such applications, embodiments of the present disclosure may be better understood in light of the aforementioned context.

Aspects of the present disclosure are directed toward on-the-fly detection of suspicious authentication behavior with a high degree of confidence. Aspects of the present disclosure can analyze encrypted network traffic between, for example, a client and server or between a client and a cloud service. More specifically, aspects of the present disclosure can analyze the encrypted portion of the authentication at an application protocol layer. Advantageously, aspects of the present disclosure can differentiate successful authentication attempts with unsuccessful authentication attempts without decrypting any of the encrypted network traffic. As a result, confidential information is never made available to the security system, thereby retaining the security of the network traffic while nonetheless enabling detection of credential attacks.

Aspects of the present disclosure can utilize a Chernoff bound and a Chebyshev bound to define an anomalous area relating authentication failures (AF) to a total number of authentication attempts. The security system can signal a potential credential attack when a number of authentication failures relative to the total number of authentication attempts falls in the anomalous area as defined by the Chernoff bound and the Chebyshev bound (e.g., when an observed number of authentication failures is greater than an upper bound number of authentication failures indicating normal authentication failure behavior that is determined using the Chernoff bound and/or the Chebyshev bound).

Referring now to the figures, FIG. 1 illustrates a computational environment 100 with a security system 108 for detecting credential attacks on encrypted network traffic, in accordance with some embodiments of the present disclosure. The computational environment 100 includes numerous client applications 102 such as client application 1 102-1, client application 2 102-2, and client application N 102-N, where N can be any whole integer and reference any number of total client applications (e.g., several, tens, hundreds, thousands, etc.). Client applications 102 can interface with services 104 via an encrypted network 106. Services 104 can refer to virtual or physical servers providing functionality to client applications 102 (e.g., application functionality, cloud-based service functionality, etc.). However, services 104 can require authentication with client applications 102 to enable client applications 102 to access the functionality provided by services 104. As previously discussed, services 104 can be maliciously accessed using credential attacks, whereby a malicious actor accesses services 104 using compromised credentials.

In some embodiments, the client applications 102, services 104, and/or encrypted network 106 can be representative of computer interactions at an end-user protocol level or at an application protocol level such as, for example, Oracle® Net Messages (TNS), server Tabular Data Stream (TDS), Sybase® Command Sequence (CMDSEQ), Informix SQL Sequence (SQLSEQ), DB2® Distributed Relational Database Architecture (DRDA), MongoDB® wire protocol, MYSQL®, NEO4J®, and the like.

Aspects of the present disclosure relate to a security system 108. The security system 108 intercepts encrypted network traffic on encrypted network 106. The security system 108 can identify authentication failures 110 from a total number of connection attempts 112 for a predefined look-back window (e.g., a period of time, a number of connection attempts, etc.). The authentication failures 110 can be differentiated from successful authentications based on characteristics of the encrypted packets (e.g., sizes of encrypted packets, patterns of encrypted packets, etc.) that are intercepted from the encrypted network 106. Furthermore, the security system 108 can identify a total number of connection attempts 112 (successful and unsuccessful) based on the characteristics of the encrypted packets (e.g., sizes of encrypted packets, patterns of encrypted packets, socket open/close events, etc.) that are intercepted from the encrypted network 106. In some embodiments, the security system 108 can monitor connection socket open events and close events to identify authentication failures. For example, a new connection opens a connection socket on the client and the server. Thus, open socket events can indicate new connections, and closing the socket during a connection authentication handshake can indicate authentication failure.

The security system 108 can utilize an anomalous function 114 to determine whether the authentication failures 110 and total connection attempts 112 indicate a potential credential attack. For example, the anomalous function 114 can take the total connection attempts 112 as input and generate an upper bound number of authentication failures 116. The upper bound number of authentication failures 116 can represent a number authentication failures above which indicates a credential attack and below which indicates normal authentication failure behavior. The upper bound number of authentication failures 116 can be compared to the authentication failures 110. If the number of authentication failures 110 is less than the upper bound number of authentication failures 116, then the security system 108 treats the authentication failures 110 and total connection attempts 112 as within normal operating conditions. On the other hand, if the number of authentication failures 110 is greater than the upper bound number of authentication failures 116, then the security system 108 can generate an alert indicating a potential credential attack involving the client applications 102 and/or services 104.

In some embodiments, the anomalous function 114 can be represented as a bounded area of a graph relating the number of authentication failures 110 (e.g., on a y-axis) to the number of total connection attempts 112 (e.g., on an x-axis). In such embodiments, the security system 108 can compare a two-dimensional coordinate of the authentication failures 110 and the total connection attempts 112 to the two-dimensional graph with an anomalous area defined, at least in part, by the anomalous function 114. If the two-dimensional coordinate of the authentication failures 110 and the total connection attempts 112 falls within the anomalous area, then the security system 108 can issue an alert indicating a possible credential attack.

As will be appreciated by one skilled in the art, the configuration shown in FIG. 1 is for illustrative purposes only, and it should not be construed as limiting. As one example, although the security system 108 is shown as separate from client applications 102 and services 104, in some embodiments, the security system 108 is a component of client applications 102 and/or services 104. In other embodiments, although security system 108 may be a stand-alone entity, the security system 108 can provision one or more agents, modules, and/or functionalities to the services 104 and/or the client applications 102. In some embodiments, the security system 108 is part of an Intrusion Detection System (IDS), an Intrusion Prevention System (IPS), a Security Information and Event Management (SIEM) system, or another security system, data protection platform, or monitoring system. In some embodiments, the security system 108 is a component of Guardium®, a product of International Business Machines (IBM) Corporation.

Referring now to FIGS. 2A and 2B, illustrated are an example unencrypted standard server response 200 and an example encrypted standard server response 202 as part of an authentication failure exchange between a client and a server. The unencrypted standard server response 200 includes 118 bytes whereas the encrypted standard server response includes 128 bytes (e.g., a 5-byte Transport Layer Security (TLS) header, a 118-byte body, and a 5-byte padding). Aspects of the present disclosure recognize that authentication failures at the application protocol layer have several distinct characteristics that make them suitable for detection without decrypting any encrypted packets. First, authentication failures are limited to the first several packets exchanged between the client/server or client/cloud service. Second, the number of authentication failure network packets is the same per connection type. Third, encrypted packets related to an authentication failure have a standard length with small variability. Fourth, server/service authentication error responses have standard sizes. Fifth, the server/service closes the connection after sending server/service authentication error response. Collectively, these characteristics make it possible to recognize authentication failures by observing the sequence and/or size of the first several packets during an authentication attempt.

This is readily observable by comparing FIGS. 2A and 2B. For example, as shown in FIG. 2A, the unencrypted standard server response 200 has a consistent presentation of information related to the authentication failure. When comparing the unencrypted standard server response 200 of FIG. 2A to the encrypted standard server response 202 of FIG. 2B, it becomes apparent that the standardized characteristics of the standard server responses to authentication failures can enable aspects of the present disclosure to identify an authentication failure even in encrypted network traffic. In some embodiments, for example, the security system 108 can determine an authentication failure occurs if fewer than a predefined number of packets are exchanged between the client and the server, the last recorded packet is sent from the server to the client, and the last recorded packet has a relatively short size. In other embodiments, the security system 108 can determine an authentication failure occurs if a packet has not been exchanged between a client and a server for a predefined period of time and a last exchanged packet was from the server to the client and had a relatively short size. In some embodiments, a successful authentication attempt is determined when a number of exchanged packets between the client and the server exceed a threshold number.

As will be appreciated by one skilled in the art, these are mere examples of rules that can be used to differentiate successful authentication from authentication failures, however, similar or different rules or combinations of rules based on packet sizes, patterns in packet sequences, delays between packet exchanges, socket open/close events, and the like can be used to differentiate successful authentications from authentication failures depending on the authentication layer protocol.

Figure 3:
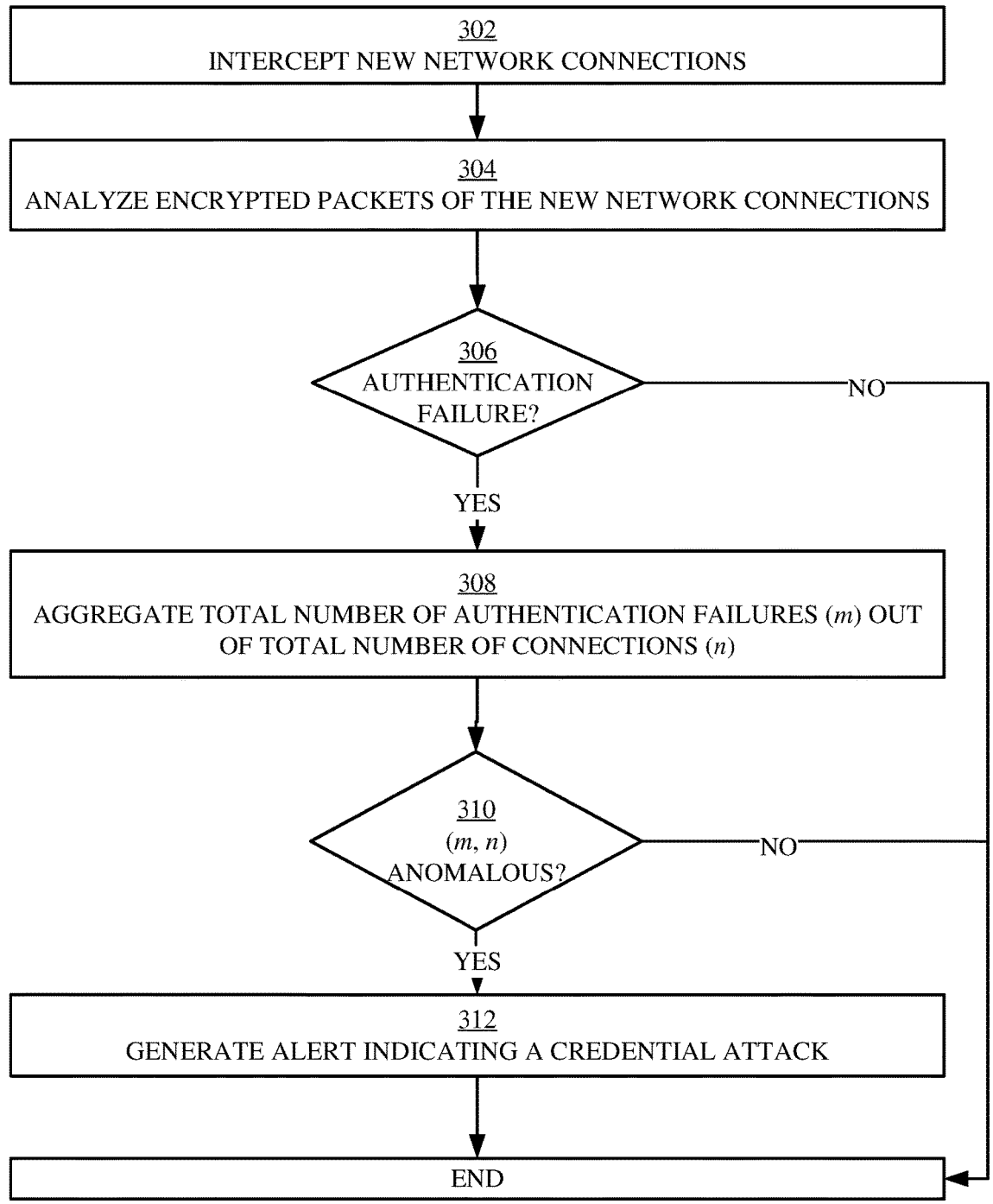
FIG. 3 illustrates a flowchart of an example method for detecting credential attacks using encrypted network traffic, in accordance with some embodiments of the present disclosure.

Referring now to FIG. 3, illustrated is a flowchart of an example method 300 for detecting credential attacks using encrypted network traffic, in accordance with some embodiments of the present disclosure. The method 300 can be implemented by a security system 108 of FIG. 1, a computer, a server, a processor, or another configuration of hardware and/or software.

Operation 302 includes intercepting new network connections. The network connections can be between, for example, a client application 102 and services 104 over an encrypted network 106. In some embodiments, the new network connections initiate with an authentication attempt or a login attempt, for example.

Operation 304 includes analyzing the encrypted packets of the new network connections. In some embodiments, operation 304 includes analyzing encrypted packets of the application layer protocol connection handshake. In some embodiments, operation 304 analyzes a size of encrypted packets, a sequence of encrypted packets, senders and receivers of encrypted packets, socket open/close events, and/or times between sent and received encrypted packets. Advantageously, operation 304 does not include decrypting any encrypted data, thereby preserving the security of confidential information that may be transmitted during the application layer protocol connection handshake.

Operation 306 includes determining if the new network connection is an authentication failure. As discussed in FIGS. 2A and 2B, aspects of the present disclosure can determine whether an authentication is successful or failed using standardized characteristics of the encrypted packets (e.g., sizes and/or patterns) that are transmitted as part of the application layer protocol connection handshake.

If a new network connection is not an authentication failure (306: NO), then the new network connection is successful, and the method 300 ends. If a new network connection is an authentication failure (306: YES), then the method 300 proceeds to operation 308.

Operation 308 includes aggregating the total number of authentication failures 110 (e.g., m) and the total number of network connection attempts 112 (e.g., n). In some embodiments, operation 308 aggregates the number of authentication failures 110 and the total number of network connection attempts 112 from a look-back window, where the look-back window can comprise a predetermined number of total connection attempts 112 (e.g., 10, 50, 100, 1000, etc.).

Regardless of how operation 308 aggregates the number of authentication failures 110 and the total number of network connection attempts 112, the threshold number of previous network connections is selected to identify credential stuffing attack with sufficient accuracy.

Operation 310 includes determining if the coordinate (m, n) (referring to the aggregate number of authentication failures 110 (m) and the total number of connection attempts 112 (n)) is anomalous. In some embodiments, operation 310 includes comparing the number of authentication failures 110 to an upper bound number of authentication failures 116 generated by an anomalous function 114 (where the anomalous function 114 uses the total number of connection attempts 112 (n) as input). In a graphical form, operation 310 can include determining whether or not the coordinate (m, n) falls within an anomalous area defined by the anomalous function 114.

If not (310: NO), then the method 300 ends. If so (310: YES), then the method 300 proceeds to operation 312. Operation 312 includes generating an alert indicating a credential attack. In some embodiments, operation 312 includes mitigating the detected credential attack. For example, in some embodiments, operation 312 can isolate services 104 or client applications 102 from the encrypted network 106 by terminating connections, implementing a customized firewall, or the like.

Figure 4:
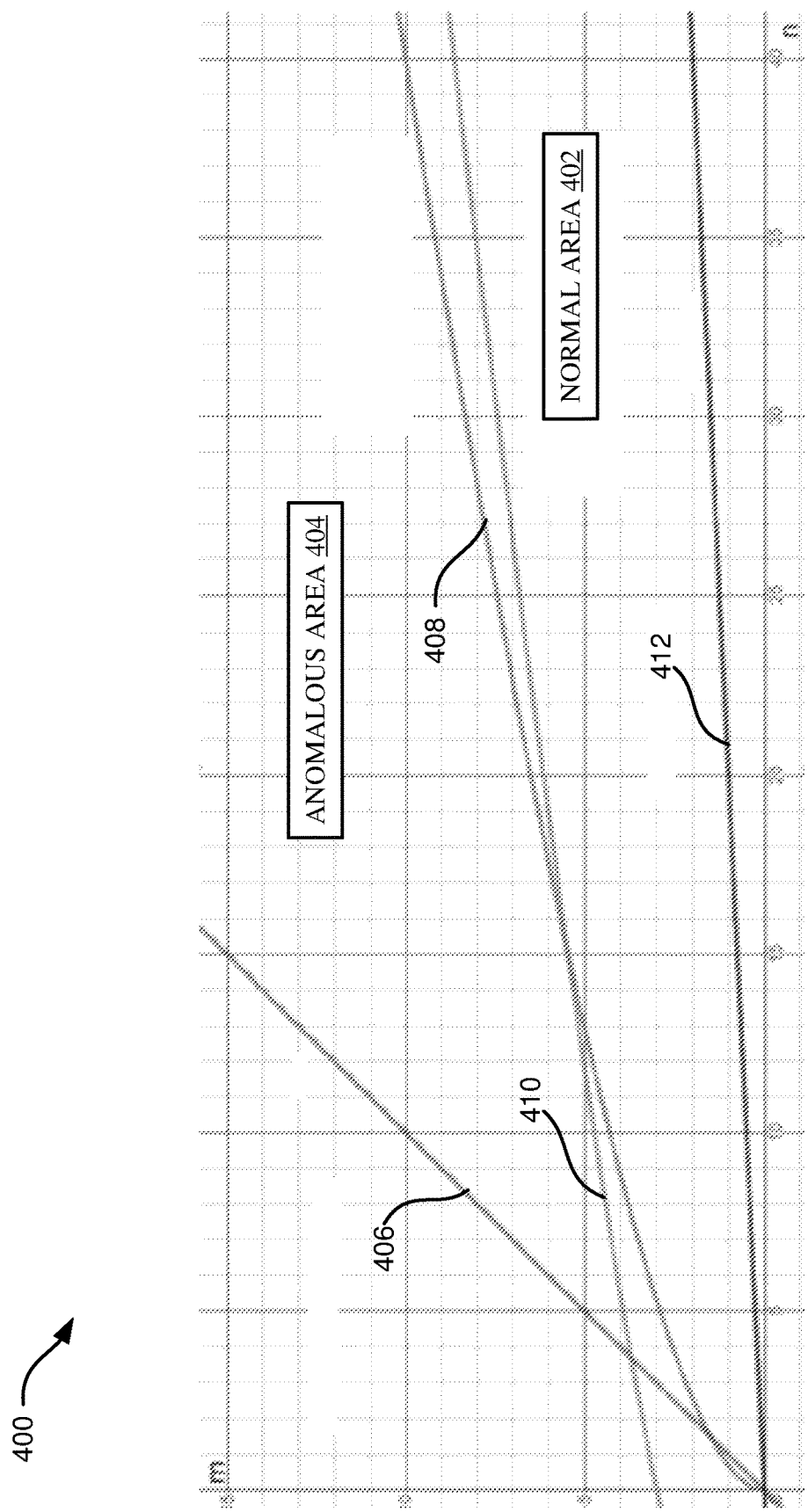
FIG. 4 illustrates a graph of an anomalous function comprising a Chebyshev bound and a Chernoff bound, in accordance with some embodiments of the present disclosure.

FIG. 4 illustrates a graph 400 of an anomalous area 404, in accordance with some embodiments of the present disclosure. In some embodiments, the graph 400 of the anomalous area 404 is consistent with the anomalous function 114 of FIG. 1. As shown in FIG. 4, the graph 400 of the anomalous area 404 illustrates the total number of connection attempts 112 (e.g., n) on the x-axis and the total number of authentication failures 110 (e.g., m) on the y-axis. The graph 400 of the anomalous area 404 is separated into a normal area 402 (indicating normal authentication attempt behavior) and an anomalous area 404 (indicating a possible credential attack). The anomalous area 404 has a functional limit 406 of m=n (e.g., every connection attempt is an authentication failure). Meanwhile, the upper bound number of authentication failures 116 separating the normal area 402 from the anomalous area 404 for each total number of connection attempts 112 (e.g., the anomalous function 114 differentiating normal area 402 from anomalous area 404) is made up of two lines—a Chebyshev bound 408 and a Chernoff bound 410. As is understood by one skilled in the art, Chebyshev's inequality (also referred to as Bienayme-Chebyshev inequality) states that, for a variety of probability distributions, no more than a certain fraction of values can be more than a predefined distance from the mean. The Chernoff bound, meanwhile, provides exponentially decreasing bounds on tail distributions of sums of independent random variables. Advantageously, the Chebyshev bound 408 and the Chernoff bound 410 provide improved accuracy in accurately identifying a credential attack from a total number of authentication failures 110 and a total number of connection attempts 112.

Either one of, or any combination of, the Chebyshev bound 408 and the Chernoff bound 410 can be used to define the upper bound number of authentication failures 116 for each total number of connection attempts 112 separating normal behavior (e.g., as represented by normal area 402) from anomalous behavior (e.g., as represented by the anomalous area 404). For example, in some embodiments, whichever bound is lesser can define the upper bound. In such embodiments, the Chebyshev bound 408 can be an upper bound for ratios of m/n below a threshold (e.g., for n-values before the intersection of the Chebyshev bound 408 and the Chernoff bound 410) and the Chernoff bound 410 can be an upper bound for ratios of m/n above the threshold (e.g., after the intersection of the Chebyshev bound 408 and the Chernoff bound 410). In other embodiments, the opposite is true and whichever bound is larger can define the upper bound. In yet other embodiments, the Chebyshev bound 408 can be used for predefined n-values and the Chernoff bound 410 can be used for other predefined n-values. In such embodiments, the Chebyshev bound 408 and the Chernoff bound 410 can be used regardless of which bound is greater or smaller.

For clarity, aspects of the present disclosure will now be discussed mathematically. Suppose P is the probability of authentication failure and $P_{max}$ is a maximum acceptable authentication failure probability. Accordingly, inequality (1) indicates that there is no abnormal authentication failure:

$$P \leq P_{max} \quad (1)$$

Furthermore, assume that authentication attempts from a client application 102 to services 104 are random and independent. The Chernoff bound 410 can be expressed as inequality (2):

$$P_r\left\{\frac{m}{n} - P_{max} \geq \xi\right\} \leq \exp\left(-\frac{\xi^2}{2P_{max} + \xi}n\right) \quad (2)$$

For inequality (2), $P_r$ can represent the probability of deviation and m is the number of authentication failures 110 out of a total of n connections 112. The term $\xi$ represents accuracy. Similarly, the Chebyshev bound 408 can be expressed by inequality (2'):

$$P_r\left\{\frac{m}{n} - P_{max} \geq \xi\right\} \leq \frac{P_{max}(1 - P_{max})}{n\xi^2} \quad (2')$$

In order to define confidence $1-\delta$ in the estimate of $P_r$, then the right-hand side of inequalities (2) and (2') are shown below as (3) and (3'):

$$\exp\left(-\frac{\xi^2}{2P_{max} + \xi}n\right) \leq \delta \quad (3)$$

$$\frac{P_{max}(1 - P_{max})}{n\xi^2} \leq \delta \quad (3')$$

The term $\delta$ can be a relatively small value approaching 0. Inequality (4) can be used to verify inequality (1) as a statistical hypothesis:

$$P_r\left\{\frac{m}{n} - P_{max} \geq \xi\right\} \leq \delta \quad (4)$$

In order to test the hypothesis of inequality (1), accuracy $\xi$ can be defined according to (5):

$$\xi = \frac{m}{n} - P_{max} > 0 \quad (5)$$

If at least one of (3) or (3') is true, then the probability of hypothesis (1) is as low as $\delta$. Therefore, with confidence $1-\delta$, the security system can confirm authentication failures as abnormal (e.g., a possible credential attack). The inequalities (3) and (3') can be transformed into formats more suitable for defining the anomalous area 404 as shown in (6) and (6'):

$$\xi \geq \frac{-\ln(\delta) + \sqrt{\ln(\delta)^2 - 8P_{max} * \ln(\delta) * n}}{2n} \quad (6)$$

$$\xi \geq \sqrt{\frac{P_{max}(1 - P_{max})}{n\delta}} \quad (6')$$

Using (5), (6), and (6'), m can be defined as a function of n (e.g., m=f(n)) for both the Chernoff bound 410 and the Chebyshev bound 408 as shown in (7) and (7'):

$$m = \frac{1}{2}\ln\left(\frac{1}{\delta}\right) * \left(1 + \sqrt{1 + \frac{8P_{max}}{\ln\left(\frac{1}{\delta}\right)} * n}\right) + P_{max} * n \quad (7)$$

$$m = \sqrt{\frac{P_{max} * (1 - P_{max})}{\delta} * n} + P_{max} * n \quad (7')$$

In some embodiments, the Chebyshev bound 408 can be defined according to (7') and the Chernoff bound 410 can be defined according to (7).

Equations (7) and (7') can be combined to define a single upper bound differentiating normal amounts of authentication failure (e.g., as represented by normal area 402) from abnormal amounts of authentication failure (e.g., as represented by anomalous area 404) as shown in (8):

$$m > \text{ceil}\left(\min\left(\sqrt{\frac{P_{max} * (1 - P_{max})}{\delta} * n},\right.\right. \quad (8)$$

$$\left.\left.\frac{1}{2}\ln\left(\frac{1}{\delta}\right) * \left(1 + \sqrt{1 + \frac{8 * P_{max}}{\ln\left(\frac{1}{\delta}\right)} * n}\right)\right) + P_{max} * n\right)$$

In some embodiments, (8) is the anomalous function 114. As shown in (8), if an observed m-value is greater than the lesser of the Chebyshev bound 408 upper bound m-value and the Chernoff bound 410 upper bound m-value, then the observed m-value can be identified as indicative of a possible credential attack. Said another way, when (8) is true, the security system 108 can be configured to generate an alert indicating a possible credential attack.

Figure 5:
FIG. 5 illustrates a graph of an anomalous function in step format, in accordance with some embodiments of the present disclosure.

FIG. 5 illustrates an example graph 500 of a stepped anomalous function, in accordance with some embodiments of the present disclosure. Similar to graph 400, the graph 500 illustrates n (e.g., total connection attempts 112) on the x-axis and in (e.g., authentication failures 110) on the y-axis. In the example shown in the graph 500, the security system 108 is configured with a maximum allowable probability of authentication failure of 0.05 (e.g., 5%). Furthermore, the security system 108 can be configured to detect a credential attack with 90% confidence. In this example, the terms $P_{max}$=0.05 and $\delta$=0.1. The graph 500 includes a normal area 502 (e.g., where P≤0.05) and an anomalous area 504 (e.g., where P>0.05). The anomalous area is defined by a functional limit 506 (e.g., m=n) and an upper bound 508. In some embodiments, the upper bound 508 can be defined according to the right-hand side of (8). As shown in the graph 500, the upper bound 508 can be stepped at predetermined intervals (e.g., to preserve whole numbers) rather than a continuous (e.g., unbroken) line as shown in graph 400. However, in other embodiments, a continuous upper bound 508 can be used, and the security system 108 can be configured to round up, down, or to a nearest whole number as part of its evaluation of whether a given coordinate (m, n) falls within the anomalous area 504 or the normal area 502.

Figure 6:
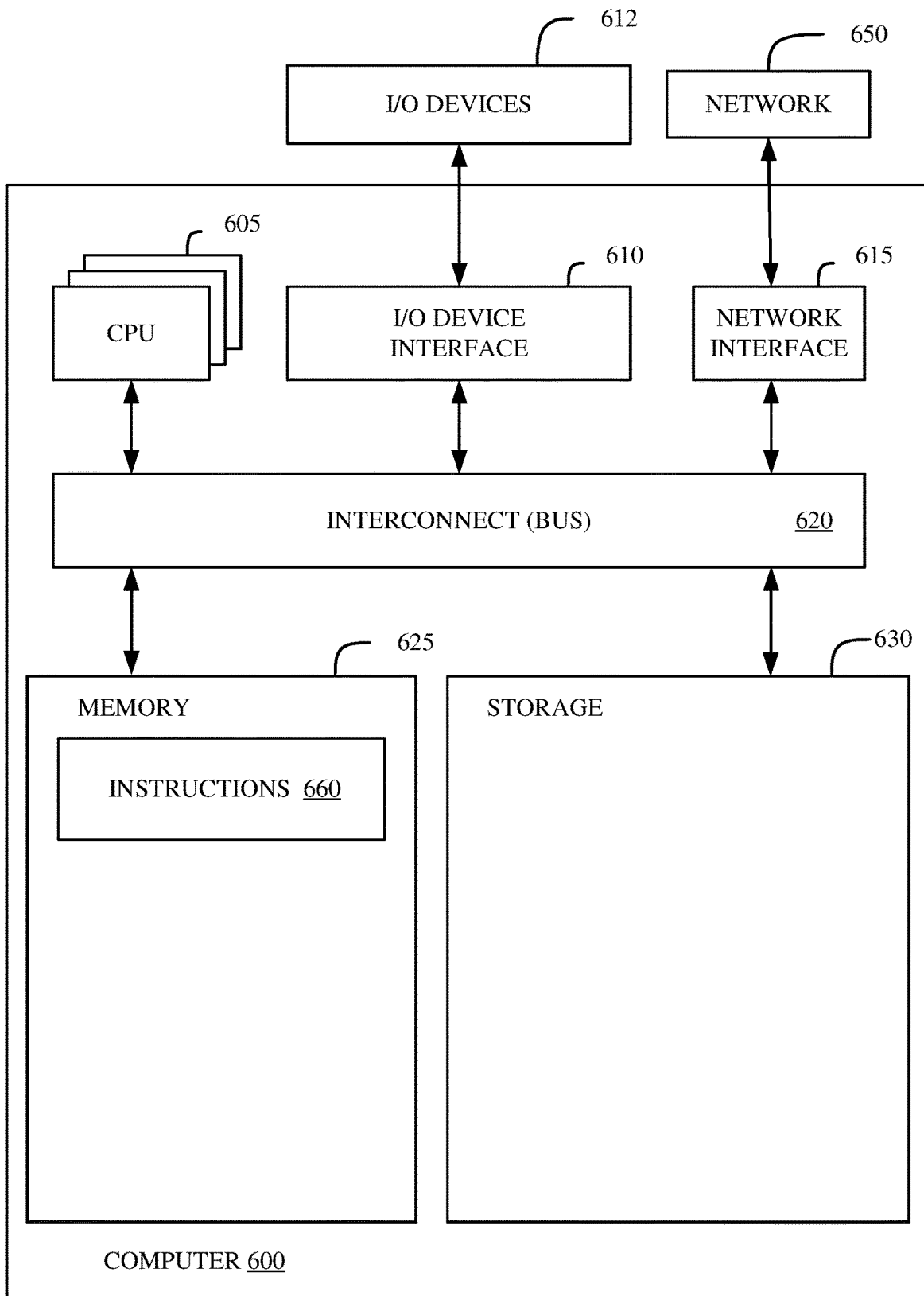
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform any or all portions of the method described in FIG. 3 and/or implement the functionality discussed in FIGS. 1-2 and/or 4-5. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine such that the client machine executes the method, or a portion of the method, based on the instructions provided by computer 600. In some embodiments, the computer 600 is incorporated into (or functionality similar to computer 600 is virtually provisioned to) one or more entities illustrated in FIG. 1 and/or other aspects of the present disclosure.

Computer 600 includes memory 625, storage 630, interconnect 620 (e.g., a bus), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more buses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random-access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the method of FIG. 3 and/or implement the functionality discussed in FIGS. 1-2 and/or 4-5. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
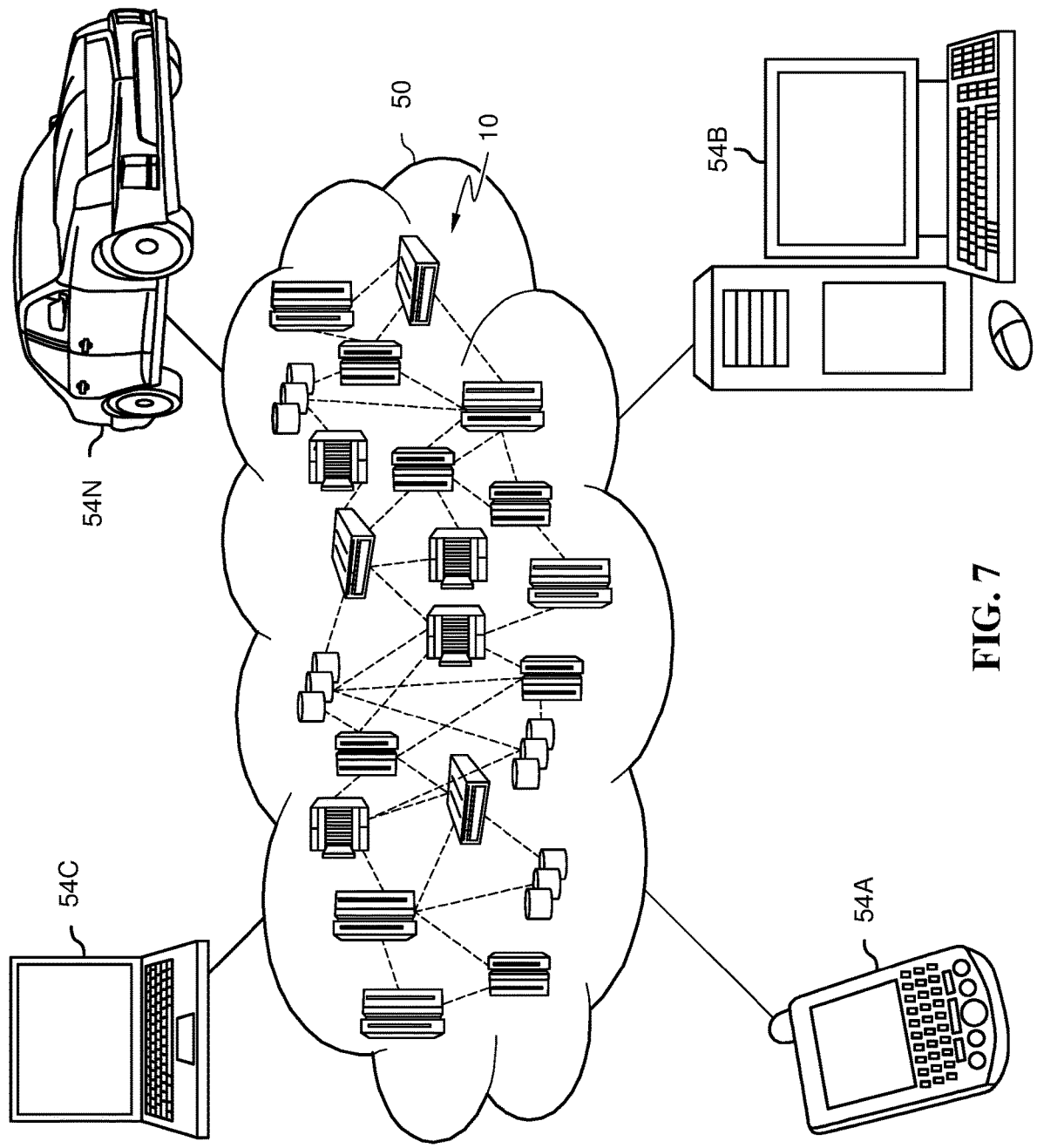
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
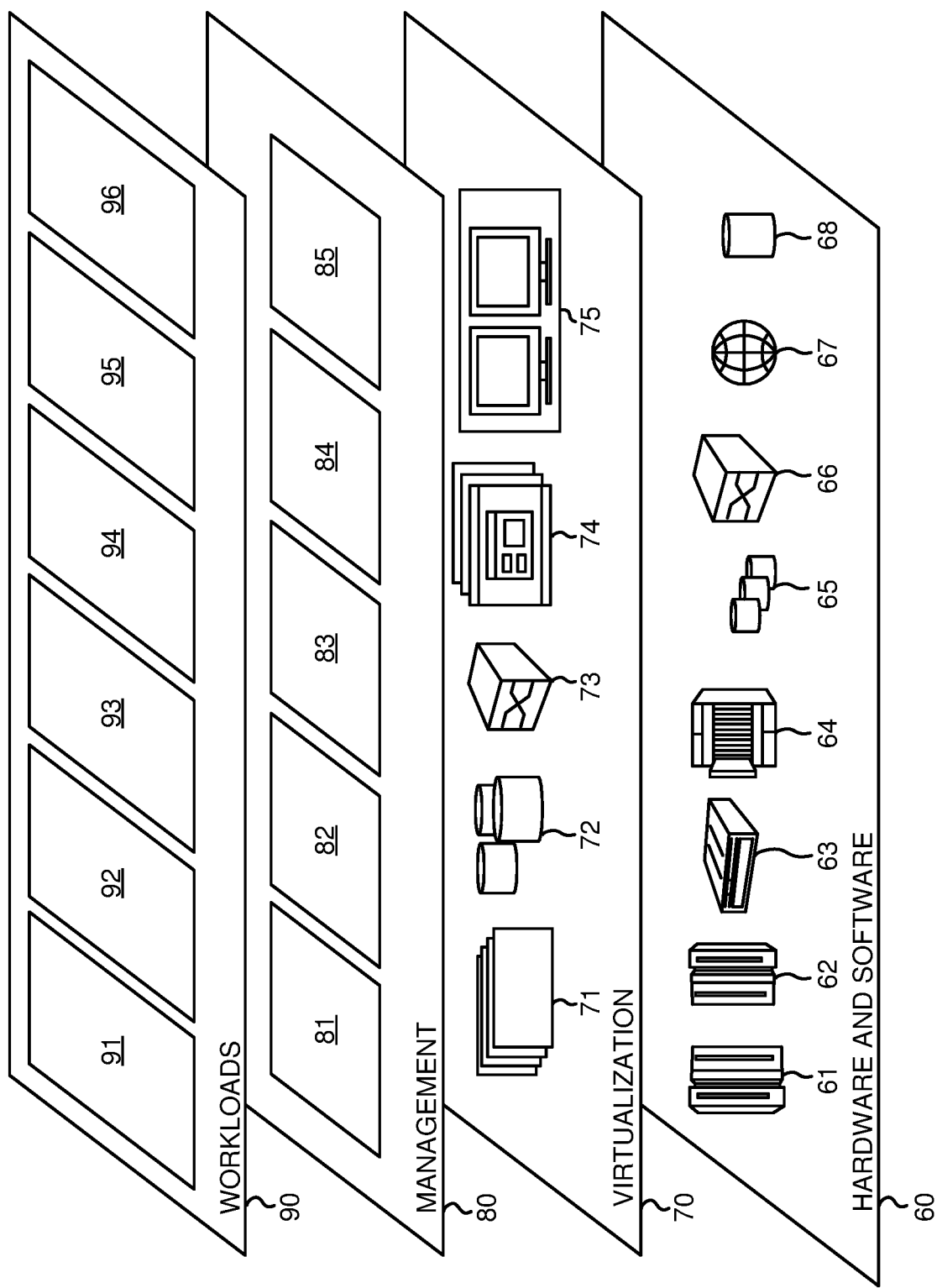
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and credential attack detection using encrypted network data 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the method described with respect to FIG. 3 and/or implement the functionality discussed in FIGS. 1-2 and/or 4-5 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes aggregating a number of authentication failures from a plurality of connection attempts for an application or a service that services a plurality of clients, wherein respective authentication failures are detected by evaluating encrypted packets of the plurality of connection attempts; determining that the number of authentication failures is greater than a upper bound number of authentication failures, wherein the upper bound number of authentication failures is determined by an anomalous function using the plurality of connection attempts as input, wherein the anomalous function is defined, at least in part, by a Chebyshev's bound and a Chernoff bound; and generating an alert indicating a potential credential attack against the application or the service.

Example 2 includes the method of example 1, including or excluding optional features. In this example, the respective authentication failures are detected, at least in part, by evaluating a size of the encrypted packets of the plurality of connection attempts, a sequence pattern of the encrypted packets during the plurality of connection attempts, and/or open/close socket events of the plurality of connection attempts.

Example 3 includes any of the methods of examples 1 to 2, including or excluding optional features. In this example, the upper bound number of authentication failures is the lesser of the Chebyshev's bound and the Chernoff bound for the plurality of connection attempts.

Example 4 includes any of the methods of examples 1 to 3, including or excluding optional features. In this example, the anomalous function is a step-function that rounds each upper bound number of authentication failures for each number of connection attempts to a whole number.

Example 5 includes any of the methods of examples 1 to 4, including or excluding optional features. In this example, the anomalous function uses the Chebyshev's bound for connection attempt values below an intersection of the Chebyshev's bound and the Chernoff bound, and wherein the anomalous function uses the Chernoff bound for connection attempt values above the intersection of the Chebyshev's bound and the Chernoff bound.

Example 6 includes any of the methods of examples 1 to 5, including or excluding optional features. In this example, the aggregating the number of authentication failures from the plurality of connection attempts occurs in real-time.

Example 7 includes the method of example 6, including or excluding optional features. In this example, the aggregating the number of authentication failures from the plurality of connection attempts uses a look-back window. Optionally, the look-back window is a number of connection attempts.

Example 8 includes any of the methods of examples 1 to 7, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 9 is a system. The system comprises one or more computer readable storage media storing program instructions; and one or more processors which, in response to executing the program instructions, are configured to perform a method according to any one of examples 1 to 8.

Example 10 is a computer program product. The computer program product comprises one or more computer readable storage media, and program instructions collectively stored on the one or more computer readable storage media, the program instructions comprising instructions configured to cause one or more processors to perform a method according to any one of examples 1 to 8.

What is claimed is:

1. A computer-implemented method comprising:
   aggregating a number of authentication failures from a plurality of connection attempts for an application or a service that services a plurality of clients, wherein respective authentication failures are detected by evaluating encrypted packets of the plurality of connection attempts;
   determining that the number of authentication failures is greater than an upper bound number of authentication failures, wherein the upper bound number of authentication failures is determined by an anomalous function using the plurality of connection attempts as input, wherein the anomalous function is defined, at least in part, by a Chebyshev's bound and a Chernoff bound; and
   generating an alert indicating a potential credential attack against the application or the service.

2. The method of claim 1, wherein the respective authentication failures are detected, at least in part, by evaluating a size of the encrypted packets of the plurality of connection attempts, a sequence pattern of the encrypted packets during the plurality of connection attempts and open/close socket events of the plurality of connection attempts.

3. The method of claim 1, wherein the upper bound number of authentication failures is the lesser of the Chebyshev's bound and the Chernoff bound for the plurality of connection attempts.

4. The method of claim 1, wherein the anomalous function is a step-function that rounds each upper bound number of authentication failures for each number of connection attempts to a whole number.

5. The method of claim 1, wherein the anomalous function uses the Chebyshev's bound for connection attempt values below an intersection of the Chebyshev's bound and the Chernoff bound, and wherein the anomalous function uses the Chernoff bound for connection attempt values above the intersection of the Chebyshev's bound and the Chernoff bound.

6. The method of claim 1, wherein the aggregating the number of authentication failures from the plurality of connection attempts occurs in real-time.

7. The method of claim 6, wherein the aggregating the number of authentication failures from the plurality of connection attempts uses a look-back window.

8. The method of claim 7, wherein the look-back window is a number of connection attempts.

9. The method of claim 1, wherein the method is performed by one or more computers according to software that is downloaded to the one or more computers from a remote data processing system; and wherein the method further comprises:
   metering a usage of the software; and
   generating an invoice based on metering the usage.

10. The method of claim 1, wherein the encrypted packets are obtained from an application protocol layer.

11. A system comprising:
    one or more computer readable storage media storing program instructions; and
    one or more processors which, in response to executing the program instructions, are configured to perform a method comprising:
    aggregating a number of authentication failures from a plurality of connection attempts for an application or a service that services a plurality of clients, wherein respective authentication failures are detected by evaluating encrypted packets of the plurality of connection attempts;
    determining that the number of authentication failures is greater than an upper bound number of authentication failures, wherein the upper bound number of authentication failures is determined by an anomalous function using the plurality of connection attempts as input, wherein the anomalous function is defined, at least in part, by a Chebyshev's bound and a Chernoff bound; and
    generating an alert indicating a potential credential attack against the application or the service.

12. The system of claim 11, wherein the respective authentication failures are detected, at least in part, by evaluating a size of the encrypted packets of the plurality of connection attempts, a sequence pattern of the encrypted packets during the plurality of connection attempts, and open/close socket events of the plurality of connection attempts.

13. The system of claim 11, wherein the upper bound number of authentication failures is the lesser of the Chebyshev's bound and the Chernoff bound for the plurality of connection attempts.

14. The system of claim 11, wherein the anomalous function is a step-function that rounds each upper bound number of authentication failures for each number of connection attempts to a whole number.

15. The system of claim 11, wherein the anomalous function uses the Chebyshev's bound for connection attempt values below an intersection of the Chebyshev's bound and the Chernoff bound, and wherein the anomalous function uses the Chernoff bound for connection attempt values above the intersection of the Chebyshev's bound and the Chernoff bound.

16. A computer program product comprising one or more computer readable storage media, and program instructions collectively stored on the one or more computer readable storage media, the program instructions comprising instructions configured to cause one or more processors to perform a method comprising:
    aggregating a number of authentication failures from a plurality of connection attempts for an application or a service that services a plurality of clients, wherein respective authentication failures are detected by evaluating encrypted packets of the plurality of connection attempts;
    determining that the number of authentication failures is greater than an upper bound number of authentication failures, wherein the upper bound number of authentication failures is determined by an anomalous function using the plurality of connection attempts as input, wherein the anomalous function is defined, at least in part, by a Chebyshev's bound and a Chernoff bound; and generating an alert indicating a potential credential attack against the application or the service.

17. The computer program product of claim 16, wherein the respective authentication failures are detected, at least in part, by evaluating a size of the encrypted packets of the plurality of connection attempts, a sequence pattern of the encrypted packets during the plurality of connection attempts, and open/close socket events of the plurality of connection attempts.

18. The computer program product of claim 16, wherein the upper bound number of authentication failures is the lesser of the Chebyshev's bound and the Chernoff bound for the plurality of connection attempts.

19. The computer program product of claim 16, wherein the anomalous function is a step-function that rounds each upper bound number of authentication failures for each number of connection attempts to a whole number.

20. The computer program product of claim 16, wherein the anomalous function uses the Chebyshev's bound for connection attempt values below an intersection of the Chebyshev's bound and the Chernoff bound, and wherein the anomalous function uses the Chernoff bound for connection attempt values above the intersection of the Chebyshev's bound and the Chernoff bound.

* * * * *